US009134411B2

(12) United States Patent
Soderi et al.

(10) Patent No.: US 9,134,411 B2
(45) Date of Patent: Sep. 15, 2015

(54) DISTANCE ESTIMATION SYSTEM AND METHOD FOR A RAILWAY VEHICLE

(75) Inventors: Simone Soderi, Florence (IT); Harri Viittala, Oulu (FI); Jani Saloranta, Oulu (FI)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/307,746

(22) Filed: Nov. 30, 2011

(65) Prior Publication Data

US 2013/0138276 A1 May 30, 2013

(51) Int. Cl.
G05D 1/02 (2006.01)
G01B 21/16 (2006.01)
G06F 19/00 (2011.01)
G01S 13/74 (2006.01)
B61L 25/02 (2006.01)
B61L 3/00 (2006.01)

(52) U.S. Cl.
CPC .................. *G01S 13/74* (2013.01); *B61L 3/008* (2013.01); *B61L 25/02* (2013.01); *B61L 25/026* (2013.01)

(58) Field of Classification Search
CPC ..... A01B 12/006; B61L 25/02; B61L 25/026; B61L 3/008
USPC ......... 342/70–72, 75; 701/19, 20, 408; 246/3, 246/121, 122 R
See application file for complete search history.

(56) References Cited

U.S. PATENT DOCUMENTS 5,420,883 A 5/1995 Swensen et al.
6,219,596 B1 * 4/2001 Fukae et al. .................... 701/23
(Continued)

FOREIGN PATENT DOCUMENTS

DE 4102812 A1 8/1992
DE 4436983 A1 4/1996
(Continued)

OTHER PUBLICATIONS

Gresham, Ian, et al., Ultra-Wideband Radar Sensors for Short-Range Vehicular Applications, IEEE Transactions on Microwave Theory and Techniques, vol. 52, No. 9, Sep. 2004, pp. 2105-2122, English language.
(Continued)

*Primary Examiner* — Redhwan k Mawari
*Assistant Examiner* — Rodney P King
(74) *Attorney, Agent, or Firm* — GE Global Patent Operation; John A. Kramer

(57) ABSTRACT

There is provided a ranging system for a railway vehicle. The system includes a reflector disposed along a railway relative to a stopping point and a ranging unit disposed on the railway vehicle. The ranging unit includes a transceiver configured to transmit an outbound signal and receive a corresponding reflected signal from the reflector. The ranging unit also includes a data storage unit configured to store a reference distance between the reflector and the stopping point. The ranging unit also includes a processor configured to determine a measured distance between the railway vehicle and the reflector based on an elapsed time between the transmitting the outbound signal and receiving the reflected signal. The processor determines a distance between the railway vehicle and the stopping point based on the measured distance and the reference distance.

21 Claims, 4 Drawing Sheets

(56) References Cited

U.S. PATENT DOCUMENTS

| | | |
|---|---|---|
| 6,366,234 B1 | 4/2002 | Katayama |
| 6,693,562 B2 | 2/2004 | Rostren |
| 7,725,252 B2 | 5/2010 | Heddebaut et al. |
| 2005/0062595 A1* | 3/2005 | Hofbeck et al. ......... 340/457.1 |
| 2010/0327125 A1 | 12/2010 | Braband et al. |
| 2011/0184621 A1 | 7/2011 | Bock et al. |

FOREIGN PATENT DOCUMENTS

| | | |
|---|---|---|
| EP | 1707979 A2 | 10/2006 |
| GB | 2283873 A | 5/1995 |
| JP | 2001-204109 A | 7/2001 |
| JP | 2002-240719 A | 8/2002 |
| KR | 20020018771 A | 3/2002 |
| WO | 2006071168 A1 | 7/2006 |
| WO | WO2009068323 A1 | 6/2009 |
| WO | 2010040654 A1 | 4/2010 |

OTHER PUBLICATIONS

Mirabadi, et al., Application of Sensor Fusion to Railway Systems, Proceedings of the 1996 IEEE/SICE/RSJ International Conference on Multisensor Fusion and Integration for Intelligent Systems, ID 0-7803-3700-X/96, 1996, pp. 185-192, English language.

Search Report and Written Opinion from corresponding PCT Application No. PCT/US2012/064027 dated Mar. 13, 2013.

* cited by examiner

100

200

102

400

DISTANCE ESTIMATION SYSTEM AND METHOD FOR A RAILWAY VEHICLE

BACKGROUND

1. Field of Invention

Exemplary embodiments of the invention relate generally to a ranging system and method for a railway vehicle. For example, embodiments relate to techniques for estimating a distance of a railway vehicle from a stopping point.

2. Discussion of Art

Conventional positioning of a moving vehicle may be based, for example, on speed and position measurements, Doppler effect, the Global Positioning System (GPS), or some combination of these. One common approach to estimating a vehicle position uses the Global Positioning System (GPS). However, GPS requires a line of sight between the receiver and the global navigation satellites. Furthermore, the accuracy provided by GPS for civilian use is limited. Another common system for determining vehicle position, referred to an inertial navigation system (INS), makes use of a gyroscope and accelerometer. One advantage of an INS is that there is no need for line of sight to an external device. However, inertial systems have unbounded position error that increases slowly with time, which means decreasing accuracy.

Other common systems for determining vehicle position include the use of speed and position measurements taken using a tachometer. Position estimates can also be achieved by transmitting measurement signals using transponders or track circuits. However, such techniques present various obstacles to obtaining accurate position estimates for a high-speed vehicle. For example, track circuit methods can only achieve accuracy equal to a length of a track block. In tachometer-based systems, position errors occur caused by slipping of the vehicle wheels. Position measurement errors may be corrected by using GPS signals. However, in many applications, including railway applications, line of sight may not always be available.

BRIEF DESCRIPTION

Briefly, in accordance with an example embodiment of the invention, there is provided a ranging system for a railway vehicle. The example embodiment includes a reflector disposed along a railway relative to a stopping point and a ranging unit disposed on the railway vehicle. The ranging unit includes a transceiver configured to transmit an outbound signal and receive a corresponding reflected signal from the reflector. The ranging unit also includes a data storage unit configured to store a reference distance between the reflector and the stopping point. The ranging unit also includes a processor configured to determine a measured distance between the railway vehicle and the reflector based on an elapsed time between the transmitting the outbound signal and receiving the reflected signal. The processor is also configured to determine a distance between the railway vehicle and the stopping point based on the measured distance and the reference distance.

In another example embodiment of the invention, there is provided a vehicle with a ranging unit. The ranging unit includes a transceiver configured to transmit an outbound signal and receive a corresponding reflected signal from a reflector. The ranging unit also includes a data storage unit configured to store a reference distance between the reflector and a stopping point. The ranging unit also includes a processor configured to determine a measured distance between the railway vehicle and the reflector based on an elapsed time between the transmitting the outbound signal and receiving the reflected signal. The processor is also configured to determine a distance between the vehicle and the stopping point based on the measured distance and the reference distance.

In another example embodiment of the invention, there is provided a method of estimating distance to a stopping point. The method includes transmitting an outbound signal from a vehicle and receiving a reflected signal from a reflector. The method also includes determining a measured distance between the vehicle and the reflector based on an elapsed time between the transmitting the outbound signal and receiving the reflected signal. The method also includes determining a distance between the vehicle and the stopping point based on the measured distance and a reference distance between the reflector and the stopping point.

DRAWINGS

These and other features, aspects, and advantages of embodiments of the invention will become better understood when the following detailed description is read with reference to the accompanying drawings in which like characters represent like parts throughout the drawings, wherein.

DETAILED DESCRIPTION

Exemplary embodiments of the invention relate to techniques for estimating a distance between a railway vehicle and a stopping point. Determination of distance is often referred to as "ranging." In accordance with an exemplary ranging system, one or more radio reflective devices are disposed at known positions along a railway track. The distance between each radio reflective device and the stopping point is referred to herein as a reference distance. The vehicle transmits an outbound radio signal that is reflected from radio reflective devices. The elapsed time between transmitting the outbound signal and receiving the reflected signal is used to calculate as estimated distance between the vehicle and the radio reflective device. The estimated distance is then be added to the reference distance to determine the distance of the vehicle from the stopping point. In embodiments, the signals transmitted by the vehicle are ultra-wideband (UWB) pulses, which provide a highly accurate distance estimate, for example, accurate to within less than one meter. The stopping distance may be used to control a braking system of the vehicle to stop the movement of the vehicle at a stopping point with sub-meter accuracy.

Figure 1:
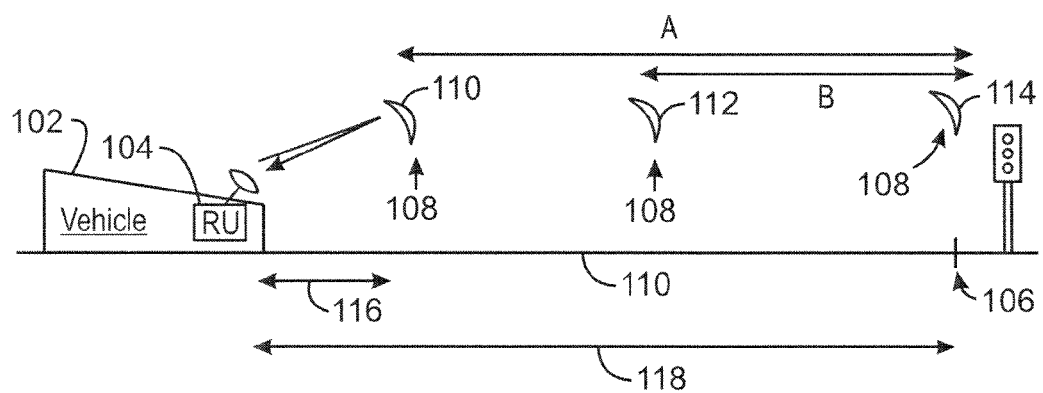
FIG. 1 is a block diagram of a ranging system, according to an exemplary embodiment of the invention.

FIG. 1 is a block diagram of a ranging system, according to an exemplary embodiment of the invention. As shown in FIG. 1, the ranging system 100 may include a vehicle 102 equipped with a ranging unit 104. In embodiments, the vehicle 102 is a rail-way vehicle such as a locomotive. The ranging unit 104 may be configured to estimate the distance of the vehicle 102 from a stopping point 106. The stopping point 106 may be a geographical location that is relevant in some way to the vehicle 102. For example, the stopping point 106 may relate to the location of a point of interest such as a loading dock, or passenger platform. In other words, the stopping point 106 may be a point at which the vehicle 102 will stop in order to properly align a loading dock or passenger platform with a corresponding feature of the vehicle. The stopping point 106 may also correspond with the location of a signal 108 associated with a switch or turnout, for example. In embodiments, the stopping point 106 may coincide with the location of another vehicle, as described further in relation to FIG. 2.

To determine the distance of the vehicle 102 from the stopping point 106, the ranging unit 104 may interact with radio reflective devices, referred to herein as reflectors 108, which are disposed along a railway track 110 at known distances from the stopping point 106. As used herein, the term "radio reflective device" or "reflector" may be used to refer to active reflectors or passive reflectors. A passive reflector refers to a reflector that does not provide any signal processing capability. For example, the passive reflector may be a parabolic reflector, a metal plate, or any other suitable piece of radio reflective material. The size and dimensions of the passive reflector may be determined based on the desired radar cross section considered suitable for a particular implementation.

An active reflector refers to a reflector that can receive, generate, and transmit radio signals using analog circuits, for example. Active reflectors may be used to modulate the amplitude or frequency or phase of the reflected signal. In environments with extensive multipath reflections, signal modulation introduced by the active reflector may improve the ability of the vehicle 102 to distinguish the reflected signal from undesired reflections. Active reflectors may also be used to increase the signal strength of the reflected signal, which can increase the distance at which the vehicle 102 can effectively detect the reflected signal. Examples of active reflectors include transponders, repeaters, and the like.

For purposes of the present description, FIG. 1 shows three reflectors 108, referred to herein as a first reflector 110, a second reflector 112, and a third reflector 114. However, it will be appreciated that embodiments can include any suitable number of reflectors 108, including 1, 2, 3, 4, 5 or more. In embodiments, the reflectors 108 may be active reflectors, passive reflectors, or some combination thereof The distances of each of the reflectors 108 from the stopping point 106 are known values. For example, each reflector 108 may be associated with a corresponding reference distance, which is a known value that describes the distance of the specific reflector 108 from the stopping point 106. For example, as shown in FIG. 1, the first reflector 110 corresponds with a reference distance A, and the second reflector corresponds with a reference distance B. In the example shown in FIG. 1, the third reflector 114 is located at or close to the stopping point 106. Therefore, the reference distance corresponding to the third reflector 114 is approximately zero. In embodiments, the third reflector 114 or a different reflector is located beyond the stopping point 106 and corresponds with a negative reference distance. Parameters describing the reference distances associated with each of the reflectors 108 may be stored to the ranging unit 104, programmed into the logic of the ranging unit 104, or otherwise accessible by ranging unit 104.

To compute the distance between the vehicle 102 and the stopping point 106, the ranging unit 104 determines an estimated distance of the vehicle 102 from the one or more of the reflectors 108. As used herein, the estimated distance of the vehicle 102 from a specific reflector 108 is referred to herein as the measured distance. For example, the measured distance between the vehicle 102 and the first reflector 110 is indicated by item number 116. The measured distances and the reference distances can be used to compute the distance between the vehicle 102 and the stopping point 106. The distance between the vehicle 102 and the stopping point 106 may be referred to herein as the stopping distance 118.

In embodiments, the ranging unit 104 determines the measured distance 116 by transmitting an outbound signal from the vehicle 102, receiving a reflected signal from one or more of the reflectors 108, and computing a time-of-flight of the signals. The time-of-flight refers to an amount of time elapsed between the transmission of the outbound signal and the receipt of the inbound signal. The time-of-flight can be used to compute the measured distance 116. In embodiments, the signals transmitted by the ranging unit 104 are ultra-wideband (UWB) signals, with frequencies of less than approximately 10 Gigahertz. The bandwidth of the wide-band signal may be approximately 500 Megahertz to 2 Gigahertz or any other suitable range.

The term "reception range" is used herein to refer to the distance at which signals reflected by the reflectors 108 can be effectively detected by the ranging unit 104. The reception range for each of the individual reflectors may be on the order of tens of meters. Depending in part on the speed of the vehicle 102, the braking distance of the vehicle 102 may several hundreds of meters. To increase the overall reception range of the ranging system 100, a plurality of reflectors 108 may be positioned along the length of the railway 106 at distance intervals less than the reception range for each of the individual reflectors 108. In this way, once the vehicle 102 is within the overall reception range of the plurality of reflectors 108, the vehicle 102 will be within the reception range of at least one of the reflectors 108.

While the vehicle 102 is approaching the stopping point 106, the positioning unit 104 may periodically transmit outbound signals in an attempt to detect a reflected signal from at least one of the reflectors 108. Once the vehicle 102 is within the reception range of the first reflector 110, the measured distance 116 can be computed based on the reflected signal, and the stopping distance 106 can be computed based on the reference distance A and the measured distance 116. The ranging unit 104 may continue to periodically send outbound signals to the in order to periodically re-compute the stopping distance 118 as the vehicle 102 approaches the stopping point 106. When the vehicle 102 passes the first reflector 110, the vehicle 102 will be within the reception range of the second reflector 112. At that time, the stopping distance 118 can be computed based on the reference distance B and the measured distance between the vehicle 102 and the second reflector 112. Similarly, when the vehicle 102 passes the second reflector 112, the vehicle will be within the reception range of the third reflector 114. At that time, the stopping distance 118 can be computed based on the measured distance between the vehicle 102 and the third reflector 114 which, in this example, is located at the stopping point 106 and therefore corresponds with a reference distance of zero. The same process may be repeated for any suitable number of reflectors 108.

In embodiments, the distance of the vehicle 102 from the stopping point 106 can also be computed using two or more measured distances based on signals received from two or more reflectors 108. For example, if the vehicle 102 is within the reception range of two of the reflectors 108, two measured distances may be computed and used to compute two stopping distances. The two stopping distances 118 may be averaged and the average stopping distance may be used in place of either of the individually computed stopping distances.

When the ranging unit 104 receives a reflected signal from one of the reflectors 108, the ranging unit 104 identifies the reflector 108 that is the source of the reflected signal in order to determine which reference distance to use in the computation of the stopping distance 118. If the reflector 108 is an active reflector, the signal generated by the active reflector may be amplitude modulated, frequency modulated, or phase modulated to create a unique signature that identifies the source of the reflected signal. In embodiments, identification of the source of the reflected signal may be based on predetermined reflector location information regarding the relative locations of the reflectors 108 along the railway 110. For example, the ranging unit 104 may be configured to identify the first encountered reflector as the first reflector 110, which corresponds to the reference distance A. The next encountered reflector can be identified by the positioning unit 104 as the second reflector 112, corresponding to the reference distance B, and so forth for each of the reflectors. The predetermined reflector location information may be stored to the ranging unit 104, programmed into the logic of the ranging unit 104, or otherwise accessible by ranging unit 104.

In embodiments, the ranging unit 104 is configured to compute the distance between reflectors 108 based on the reflected signals received from each of the reflectors 108. The computed distance between the reflectors 108 may be matched against the predetermined reflector location information to facilitate identification of the reflectors 108. In embodiments, the distance between the reflectors 108 may be different for different pairs of reflectors 108. In other words, the distance between the first reflector 110 and the second reflector 112 may be different from the distance between the second reflector 112 and the third reflector 114. The different distances between the reflectors 108 can be used by the ranging unit 104 to help identify the reflectors 108 by matching the computed distance between the reflectors 108 against the predetermined reflector location information. In embodiments, identification of the reflectors may use any of the techniques described above, alone or in any combination.

Figure 2:
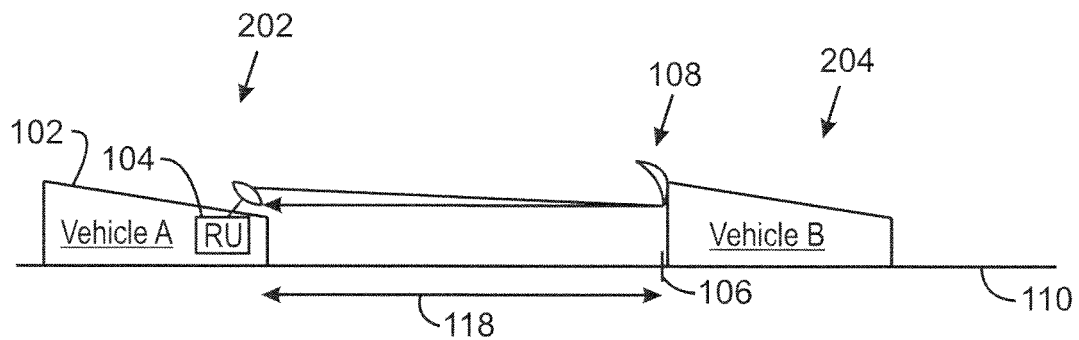
FIG. 2 is a block diagram of a ranging system, according to an exemplary embodiment of the invention.

FIG. 2 is a block diagram of a positioning system, according to an exemplary embodiment of the invention. As in the positioning system 100 described in reference to FIG. 1, the positioning system 200 may include a vehicle 102, referred to in FIG. 2 as vehicle A 202, which is equipped with a ranging unit 104 that estimates the stopping distance 118 between vehicle A 202 and a stopping point 106. In the embodiment shown in FIG. 2, the stopping point 106 corresponds to the location of a second vehicle, referred to as vehicle B 204. In embodiments, the positioning system 200 may be used for automatic docking of vehicle A 202 to vehicle B 204. During the docking process, vehicle A 202 will be travelling at a slow rate of speed, for example, approximately 10 kilometers per hour or less. Thus, a single reflector 108 will provide sufficient reception range to enable vehicle A to stop at the stopping point 106. The reflector 108 may be an active or passive reflector. In embodiments, the reflector is a separate device mounted to the rear of vehicle B 204. In embodiments, the surface of vehicle B 204 that faces vehicle A 202 may be used as a passive reflector, and a separate radio reflective device is not mounted to vehicle B.

As described in relation to FIG. 1, the stopping distance 118 may be computed based in part on the measured distance, which is calculated using the time-of-flight of the signals transmitted by ranging unit 104 and reflected from the reflector 108. The stopping distance 118 can then be determined from the measured distance and a reference distance. The reference distance may be a value that ensures that the mechanical coupling components of vehicle A 202 and vehicle B 204 are engaged when vehicle A 202 reaches the stopping point 106. In embodiments, the computed stopping distance 118 is used to generate a braking control signal.

Figure 3:
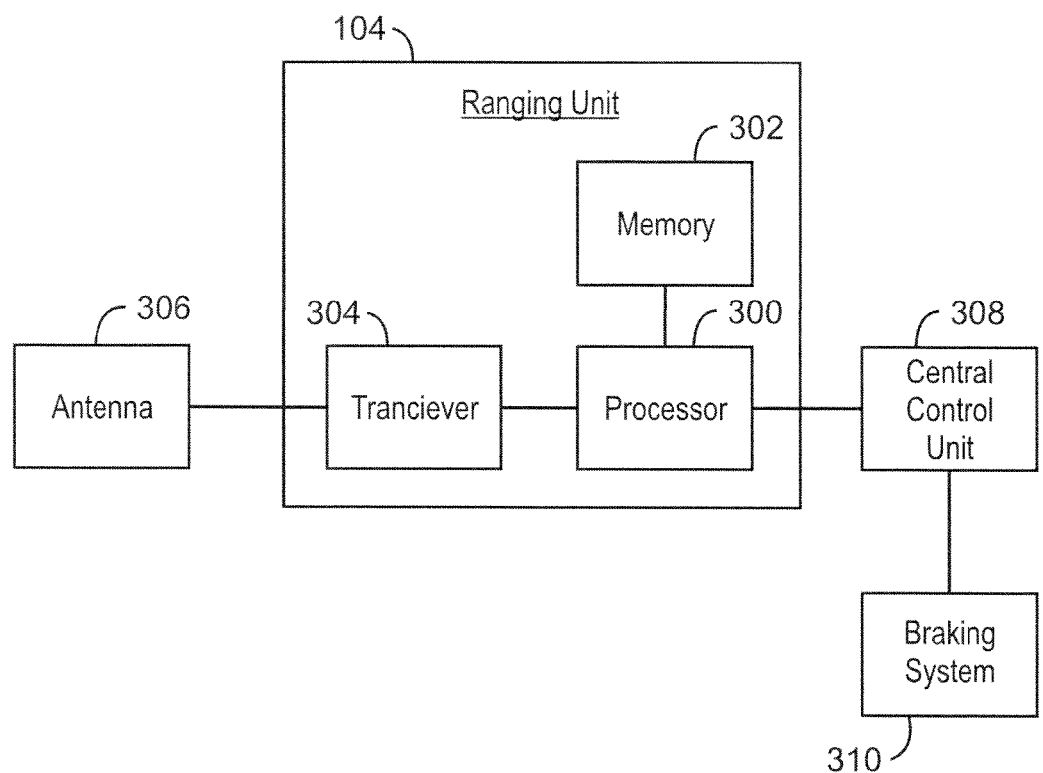
FIG. 3 is a block diagram of a vehicle that includes a ranging unit, in accordance with exemplary embodiments of the invention.

FIG. 3 is block diagram of a vehicle that includes a ranging unit, in accordance with exemplary embodiments of the invention. As shown in FIG. 3, the ranging unit 104 may include a processor 300 and a memory 302 comprising a non-transitory, computer-readable medium. The memory 302 may include volatile memory such as Random Access Memory (RAM) used during the execution of various operating programs, including operating programs and data used in embodiments of the present invention. The memory 302 can also include a storage system for the long-term storage of operating programs and data, including the operating programs and data used in embodiments of the present invention. For example, the memory 302 can include a hard disk drive, an optical drive, a universal serial bus (USB) drive, solid state memory, and the like. In embodiments, the processor 300 and the memory 302 may be implemented as an Application Specific, Integrated Circuit (ASIC). In embodiments, the ranging unit 104 may be implemented on a general-purpose computing device such as a laptop computer.

The ranging unit 104 may include a transceiver 304, which is communicatively coupled to the processor 300 and enables the ranging unit 104 to send outbound signals and receive inbound signals from the reflectors 108 (FIGS. 1 and 2). The transceiver 304 may include one or more amplifiers, signal processors, and any other circuitry which may be used to enable the ranging unit 104 to transmit and receive radio signals. The transceiver 304 may be operatively coupled to a corresponding antenna 306, which may be disposed in or on the vehicle 102. In embodiments, the transceiver 304 interacts with the reflectors 108 by transmitting ultra-wideband (UWB) pulses and receiving corresponding echoes from the reflectors 108.

In embodiments, the ranging unit 104 may be communicatively coupled to a central control unit 308 of the vehicle 102. The stopping distance computed by the ranging unit 104 may be output to the central control unit 308. The central control unit 308 may use the stopping distance for a variety of purposes. In an embodiment, the stopping distance may be communicated to a person such as a vehicle operator through a user interface. In an embodiment, the central control unit 308 may be operatively coupled to a braking system of the vehicle 102. In such embodiments, the central control unit 308 may compute a braking signal based, at least in part, on the stopping distance received from the ranging unit 104. The braking signal may determine a degree of braking to be applied to the vehicle 102 and may be computed based, for example, on the speed of the vehicle 102 and the distance of the vehicle 102 from the stopping point 106. The braking signal may be sent from the central control unit 308 to the braking system 310 to engage the brakes of the vehicle 102 until the vehicle 102 comes to rest at the stopping point 106.

Figure 4:
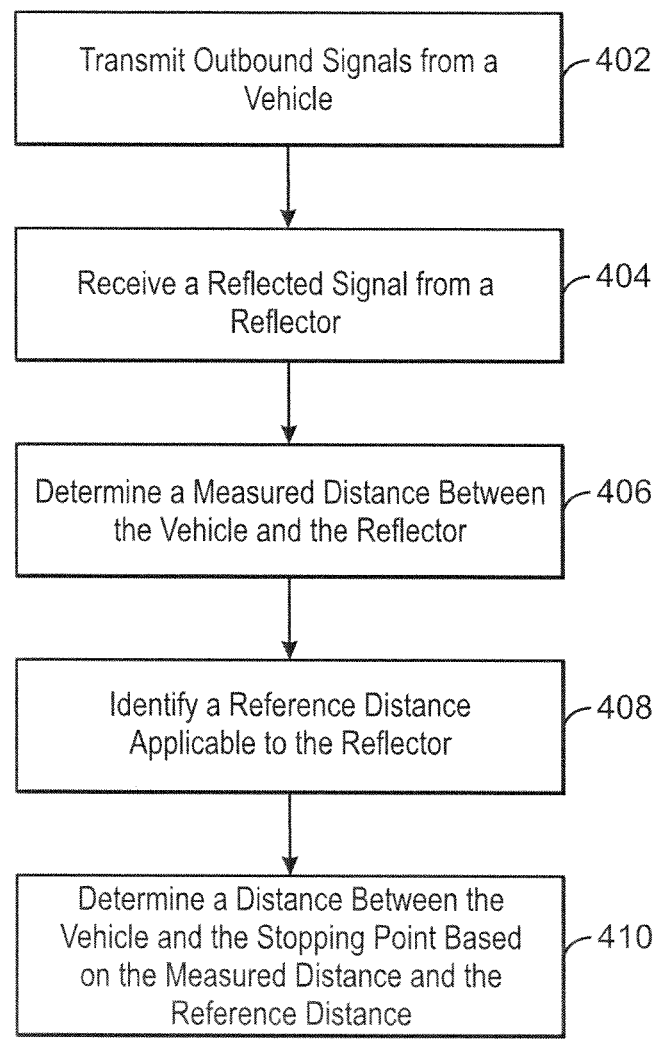
FIG. 4 is a method of estimating a distance to a stopping point, in accordance with exemplary embodiments of the invention.

FIG. 4 is a process flow diagram summarizing a method of estimating a distance to a stopping point. The method 400 may be performed by the ranging unit 104 and is described herein with reference also to FIGS. 1-3. The method 400 may begin at block 402, wherein the outbound signals are transmitted from the vehicle 102, for example, by the ranging unit 104.

At block 404, the ranging unit 104 of the vehicle 102 receives a reflected signal form a reflector 108 disposed along the railway 110. The reflected signal corresponds to the outbound signal transmitted at block 402.

At block 406, a measured distance between the vehicle 102 and the reflector 108 is computed. The measured distance is based on an elapsed time between the transmitting the outbound signal and receiving the reflected signal.

At block 408, a reference distance corresponding to the reflector 108 is identified by the ranging unit 104. As explained above, if the ranging system includes more than one reflector 108, the reflector 108 that is the source of the reflected signal may be identified based on a unique signal modulation signature applied by the reflector 108, the relative positions of the reflectors 108, or some combination thereof. Once the source of the reflection is identified, the specific reference distance applicable to that reflector 108 can be identified and retrieved by the ranging unit 104.

At block, 410, the distance between the vehicle 102 and the stopping point 106 may be determined based on the measured distance and the reference distance. For example, the measured distance and the reference distance may be simply added together. The ranging unit 104 may output the stopping distance to the central control unit 308, which engages the braking system 310 of the vehicle 102 based on the stopping distance as described above.

Steps 402 through 410 may be periodically repeated to track the stopping distance as the vehicle 102 moves approaches the stopping point 106. Each computed stopping distance may be output to the central control unit 308, which can adjust the degree of braking accordingly. In embodiments with more than one reflector 108, the source of the reflected signal used to compute the measured distance may change as the vehicle 102 passes individual reflectors 108, in which case, the ranging unit 104 can select a new reference distance applicable to the next reflector 108 along the track 110. The method 400 may be repeated until the vehicle 102 comes to rest at the stopping point 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. The dimensions, values, and types of materials described herein are intended to illustrate embodiments of the invention, but are by no means limiting and are exemplary in nature. Other embodiments may be apparent upon reviewing the above description. The scope of the invention, therefore, should be determined with reference to the appended claims, along with the full scope of equivalents to which such claims are entitled.

In the appended claims, any usage of the terms "including" and "in which" are indicated the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Certain changes may be made in the above-described apparatus, without departing from the spirit and scope of the invention herein involved. Accordingly, it is intended that all of the subject matter of the above description or shown in the accompanying drawings shall be interpreted merely as examples illustrating the inventive concept herein and shall not be construed as limiting the invention.

The invention claimed is:

1. A ranging system for a railway vehicle, comprising:
reflectors disposed along a railway at different locations relative to a stopping point; and
a ranging unit disposed on the railway vehicle, the ranging unit comprising:
a transceiver configured to transmit outbound signals and receive corresponding reflected signals from the reflectors, the reflected signals being modulated by the reflectors;
a data storage unit configured to store one or more reference distances between one or more of the reflectors and the stopping point; and
a processor configured to:
identify at least one of the reflectors from among the reflectors using modulation of the reflected signal;
determine one or more measured distances between the railway vehicle and the at least one of the reflectors based on an identification of the at least one of the reflectors ; and
determine one or more distances between the railway vehicle and the stopping point based on the one or more measured distances and the one or more reference distances.

2. The ranging system of claim 1, wherein the outbound signals generated by the transceiver are ultra-wideband (UWB) pulses.

3. The ranging system of claim 1, wherein the at least one of the reflectors is an active reflector configured to modulate the reflected signal.

4. The ranging system of claim 1, comprising a control unit communicatively coupled to the ranging unit and configured to generate a braking control signal based on the one or more distances between the railway vehicle and the stopping point.

5. The ranging system of claim 1, wherein separation distances between two or more of the reflectors is less than a reception range for each of the reflectors individually.

6. The ranging system of claim 5, wherein the reflectors include a second reflector that corresponds to a second reference distance between the second reflector and the stopping point; and:
when the railway vehicle enters the reception range of the second reflector, the processor computes the stopping distance based on the second reference distance and a second measured distance between the railway vehicle and the second radio reflected device; and
when the railway vehicle passes the second reflector, the processor computes the stopping distance based on the reference distance and the measured distance.

7. The ranging system of claim 1, wherein the processor also is configured to calculate separation distances between the reflectors and to identify the at least one of the reflectors from among the reflectors based on the separation distances between the reflectors.

8. A vehicle, comprising:
a ranging unit comprising:
a transceiver configured to transmit an outbound signal and receive a corresponding reflected signal from a first reflector that has been modulated by the first reflector;

a data storage unit configured to store a reference distance between the reflector and a stopping point; and
a processor configured to:
identify the first reflector from among several reflectors using modulation of the first reflector;
determine a measured distance between the vehicle and the first reflector based on an identification of the first reflector; and
determine a distance between the vehicle and the stopping point based on the measured distance and the reference distance.

9. The vehicle of claim 8, wherein the outbound signal generated by the transceiver is an ultra-wideband (UWB) pulse.

10. The vehicle of claim 8, comprising a control unit communicatively coupled to the ranging unit and configured to generate a braking control signal based on the distance between the vehicle and the stopping point.

11. The vehicle of claim 8, wherein the first reflector is one of several reflectors, and the processor also is configured to calculate separation distances between the reflectors and to identify the first reflector from among the reflectors based on the separation distance between the first reflector and at least one other reflector.

12. The vehicle of claim 8, wherein the processor is configured to determine a second measured distance between the vehicle and a second reflector when the vehicle enters a reception range of the second reflector and determine the measured distance between the vehicle and the second reflector when the vehicle passes the second reflector.

13. The vehicle of claim 8, wherein the vehicle is a railway vehicle.

14. A method of estimating distance to a stopping point, comprising:
transmitting a first outbound signal from a vehicle;
receiving a first reflected signal from a first reflector that is modulated by the first reflector from the first outbound signal;
determining an identity of the first reflector from among several reflectors based on modulation of the first outbound signal in the first reflected signal that is received;
determining a measured distance between the vehicle and the first reflector based on the identity of the first reflector; and
determining a distance between the vehicle and the stopping point based on the measured distance and a reference distance between the first reflector and the stopping point.

15. The method of claim 14, wherein transmitting the first outbound signal comprises transmitting an ultra-wideband (UWB) pulse.

16. The method of claim 14, wherein receiving the first reflected signal comprises receiving a modulated signal as the reflected signal.

17. The method of claim 14, comprising generating a braking control signal based on the distance between the vehicle and the stopping point and sending the braking control signal to a braking system of the vehicle.

18. The method of claim 14, comprising:
transmitting a second outbound signal from the vehicle;
receiving a second reflected signal from a second reflector disposed further away from the stopping point than the first reflector, the second reflected signal being the second outbound signal modulated by the second reflector;
determining an identity of the second reflector based on modulation of the second reflected signal;
determining a second measured distance between the vehicle and the second reflector based on the identity of the second reflector; and
determining a second distance between the vehicle and the stopping point based on the second measured distance and a second reference distance between the second reflector and the stopping point.

19. The method of claim 14, further comprising calculating separation distances between the reflectors, and wherein determining the identity of the first reflector can be assisted using the separation distance between the first reflector and at least one other reflector.

20. A ranging system, comprising:
a ranging unit comprising:
a transceiver configured to transmit an outbound signal and receive a corresponding reflected signal from a first reflector of several reflectors, the outbound signal being modulated by the first reflector to generate the reflected signal;
a data storage unit configured to store identities of the reflectors and reference distances between the corresponding reflectors and a stopping point; and
a processor configured to:
determine an identity of the first reflector based on modulation of the outbound signal in the reflected signal;
determine a measured distance between the first reflector and a vehicle outfitted with the ranging unit based on the identity of the first reflector; and
determine a distance between the vehicle and the stopping point based on the measured distance and the reference distance.

21. The ranging system of claim 20, wherein the processor also is configured to calculate separation distances between the reflectors and to assist identification of the at least one of the reflectors from among the reflectors based on the separation distances between the reflectors.

* * * * *